UNITED STATES PATENT OFFICE.

FRIEDRICH WILHELM WEBER, OF PERTH AMBOY, NEW JERSEY, ASSIGNOR TO THE ROESSLER & HASSLACHER CHEMICAL CO., OF NEW YORK, N. Y., A CORPORATION OF NEW YORK.

CATALYZER AND PROCESS OF MAKING THE SAME.

1,252,973.

Specification of Letters Patent.     Patented Jan. 8, 1918.

No Drawing.     Application filed May 3, 1915. Serial No. 25,520.

*To all whom it may concern:*

Be it known that I, FRIEDRICH WILHELM WEBER, a subject of the Emperor of Germany, and a resident of the city of Perth Amboy, county of Middlesex, and State of New Jersey, have invented certain new and useful Improvements in Catalyzers and Processes of Making the Same, of which the following is a specification.

This invention relates to catalyzers and processes of making the same, and it particularly refers to catalyzers adapted for decomposing solutions of chemical compounds containing oxygen in available form, thus liberating oxygen in gaseous form.

Heretofore great efforts have been made to prepare a catalyzer for the decomposition of solutions of compounds containing oxygen in available form which compounds are used for many purposes as for instance for the well known oxygen baths, but none of the many suggestions offered on the market has really proved satisfactory in fulfilling the various requirements. Inasmuch as such catalyzers should not produce any sediment in or cause discoloration of the bath, all of the catalyzers used up to now have been the source of disappointment in one way or another; the catalyzers hitherto known have mostly been in the form of powders of solid materials not readily soluble, as for instance almond meal, and thus have been too slow in their action.

Among others, ox-liver has also been used for this purpose, either in its fresh or dry state, but the use of this material could never get any foothold, the odor generated by the liver being too repugnant to most people.

I have discovered, however, that ox-liver may be deprived of its unpleasant odor and may be prepared so as to exert a very effective action on solutions of chemical compounds containing oxygen in available form, for instance on solutions of sodium perborate, the process of bringing ox-liver into this active form and the products obtained thereby being the subject matter of the present application.

In order to carry out my invention I proceed substantially as follows:

Ox-liver, preferably in fresh condition, is brought into a fine paste by passing it through a suitable meat-cutter and the semi-liquid mass is then mixed with infusorial-earth until it crumbles, whereupon almond meal is added to form a dry mass. The mass thus obtained is now put into a percolator where it undergoes an extraction process by means of a solution consisting of glycerin and water, a solution containing approximately 30% glycerin having been found satisfactory. When the mass treated has been exhausted, I find it advisable to add about 5% of sodium benzoate to the liquor thus obtained to keep it well preserved. The glycerin may, if desired, be substituted by other organic solvents which, being miscible with, or soluble in, water, are capable of forming a homogeneous fluid, and have preservative properties.

By operating as described I succeed in obtaining highly concentrated liquors; for instance, I obtain from 600 grams fresh ox livers 2000 cc. of the glycerin extract, said liquor containing in 100 parts the soluble matter of 30 grams of fresh ox-liver.

The effect of the catalyzer is rather surprising. For instance, a bath of 300 liters of water, containing 200 grams of sodium perborate becomes entirely exhausted in fifteen minutes if 34 cc. of my new liquid catalyzer, containing the soluble matter of about 10 grams of ox-liver, are added, the bath after treatment being still absolutely clear and showing neither turbidity nor discoloration. The great superiority of my new liquid catalyzer over the known catalyzers consisting of the powder of some solid material for example, is probably due to its property of diffusing freely through the bath fluid and thus exerting its action immediately all through the whole volume of the bath, whereas the solid catalyzers either fall to the bottom or, being carried by gas bubbles, float on the surface of the water, forming an unpleasant foam, with the result that in either case only an infinitely small surface of catalyzer acts on the bath, the activity of such solid catalyzer being thus greatly reduced.

It is not essential for the successful work of the catalyzer that the almond meal be added to the ox-liver. The addition of almond meal, however, conveys the pleasant smell of benzaldehyde to the catalyzer, while the catalyzer made without the addition of almond meal possesses a like pleasant smell resembling that of apple cider still in a stage of fermentation. Where I use the term "ox-liver" in the claims, I mean to include such whether in the fresh or dry state.

I claim:

1. The process of making a liquid catalyzer, consisting in extracting ox-liver with a solvent possessing preservative properties.

2. The process of making a liquid catalyzer, consisting in extracting ox-liver with a solvent possessing preservative properties and capable of forming a homogeneous fluid with water.

3. The process of making a liquid catalyzer, consisting in extracting ox-liver with a solvent containing glycerin.

4. The process of making a liquid catalyzer, consisting in extracting ox-liver with a solution of glycerin and water.

5. The process of making a liquid catalyzer, consisting in extracting ox-liver with a solution consisting of approximately 30% glycerin and 70% of water.

6. The process of making a liquid catalyzer, consisting in preparing a fine paste of ox-liver, mixing infusorial earth with said paste and extracting the mass thus obtained.

7. The process of making a liquid catalyzer, consisting in preparing a fine paste of ox-liver, mixing infusorial earth with said paste, and extracting the mass thus obtained with a solvent containing glycerin.

8. The process of making a liquid catalyzer, consisting in preparing a fine paste of fresh ox-liver, mixing infusorial earth with said paste, and extracting the mass thus obtained with a solution consisting of water and glycerin.

9. The process of making a liquid catalyzer, consisting in preparing a fine paste of fresh ox-liver, mixing infusorial earth with said paste, and extracting the mass thus obtained with a solution consisting of approximately 70% water and 30% glycerin.

10. The process of making a liquid catalyzer, consisting in preparing a fine paste of ox-liver, mixing infusorial earth with said paste, adding almond meal to the mixture and extracting the mass thus obtained.

11. The process of making a liquid catalyzer, consisting in preparing a fine paste of ox-liver, mixing infusorial earth with said paste, adding almond meal to the mixture and extracting the mass thus obtained with a solvent containing glycerin.

12. The process of making a liquid catalyzer, consisting in preparing a fine paste of ox-liver, mixing infusorial earth with said paste, adding almond meal to the mixture and extracting the mass thus obtained with a solution consisting of water and glycerin.

13. The process of making a liquid catalyzer, consisting in preparing a fine paste of ox-liver, mixing infusorial earth with said paste, adding almond meal to the mixture and extracting the mass thus obtained with a solution consisting of approximately 70% water and 30% glycerin.

14. A liquid catalyzer containing the soluble matter of ox-liver and a solvent.

15. A liquid catalyzer containing the soluble matter of ox-liver and glycerin.

16. A liquid catalyzer containing the soluble matter of ox-liver, glycerin and water.

17. A liquid catalyzer containing the soluble matter of ox-liver and almond meal, glycerin, water and a preservative.

18. A liquid catalyzer containing the soluble matter of ox-liver and almond meal, glycerin, water and sodium benzoate.

In testimony whereof I have signed this specification in the presence of two subscribing witnesses.

FRIEDRICH WILHELM WEBER.

Witnesses:
WILLARD N. BRUNER,
OTTO K. ZWINGENBERGER.